(12) United States Patent
Kitano

(10) Patent No.: US 6,740,175 B2
(45) Date of Patent: May 25, 2004

(54) HIGH STRENGTH STEEL FOR INDUCTION HARDENING

(75) Inventor: Shuhei Kitano, Himeji (JP)

(73) Assignee: Sanyo Special Steel Co., Ltd., Hyogo-Ken (JP)

(*) Notice: Subject to any disclaimer, the term of this patent is extended or adjusted under 35 U.S.C. 154(b) by 0 days.

(21) Appl. No.: 10/062,399

(22) Filed: Feb. 1, 2002

(65) Prior Publication Data

US 2002/0185201 A1 Dec. 12, 2002

(30) Foreign Application Priority Data

Feb. 1, 2001 (JP) ........................... 2001-025874
May 10, 2001 (JP) ........................... 2001-140603

(51) Int. Cl.$^7$ ........................... C22C 38/02; C22C 38/04
(52) U.S. Cl. ........................... 148/328; 148/320; 148/333
(58) Field of Search ........................... 148/328, 333, 148/320, 583, 569; 420/124

(56) References Cited

U.S. PATENT DOCUMENTS 6,372,057 B1 * 4/2002 Fujimura et al. ........... 148/581

FOREIGN PATENT DOCUMENTS

| JP | (1996) 08-326862 A | 12/1996 | |
| JP | 410017935 A | * 1/1998 | ............ C21D/9/32 |
| JP | 410317095 | * 12/1998 | ........... C22C/38/00 |

* cited by examiner

*Primary Examiner*—Deborah Yee
(74) *Attorney, Agent, or Firm*—Webb Ziesenheim Logsdon Orkin & Hanson, P.C.

(57) ABSTRACT

The present invention provides a steel product which, while minimizing an increase in hardness after forging to ensure machinability and cold workability, is improved, for example, in fatigue strength in its non-hardened portion and is improved, in its hardened portion, in rolling resistance level, antipitting level, abrasion resistance, and fatigue strength. The high strength steel for induction hardening comprises, by mass, carbon (C): 0.5 to 0.7%, silicon (Si): 0.5 to 1.0%, manganese (Mn): 0.5 to 1.0%, chromium (Cr): not more than 0.4%, and sulfur (S): not more than 0.035% with the balance consisting of iron (Fe) and unavoidable impurities, the steel being forged to produce a component at least a part of which is then inductively hardened before use.

4 Claims, 11 Drawing Sheets

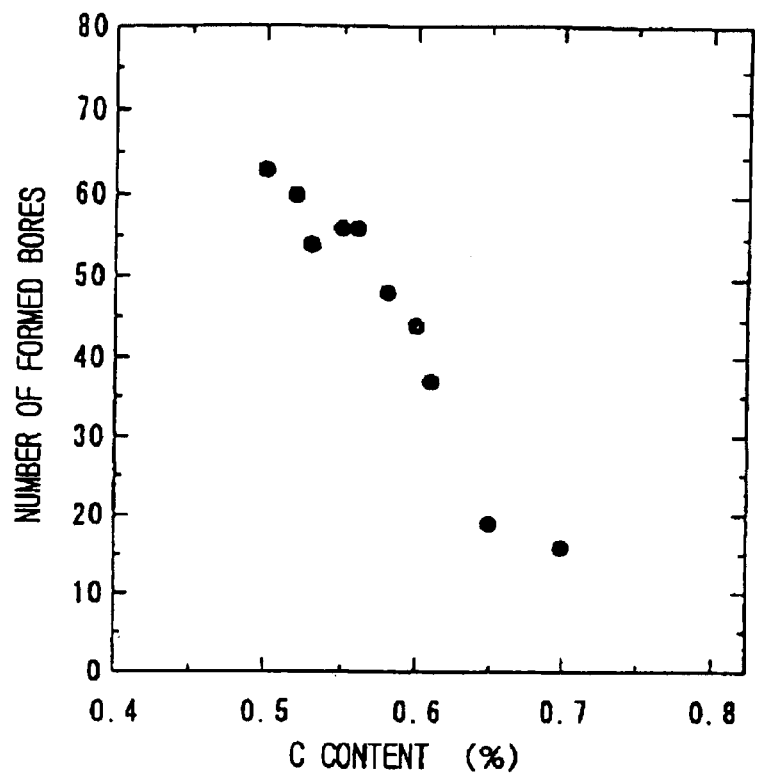
F I G. 1
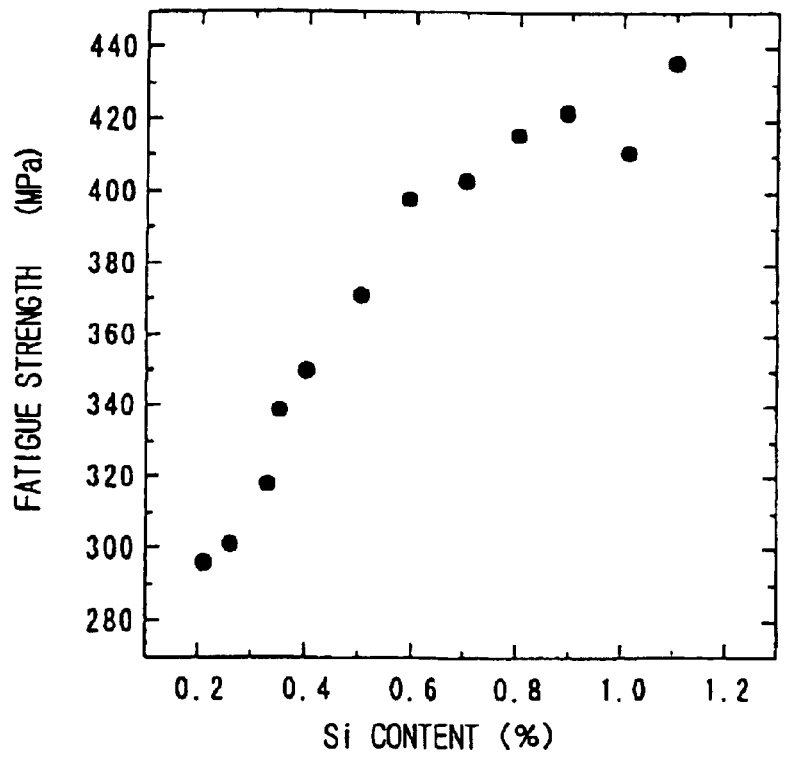
F I G. 2

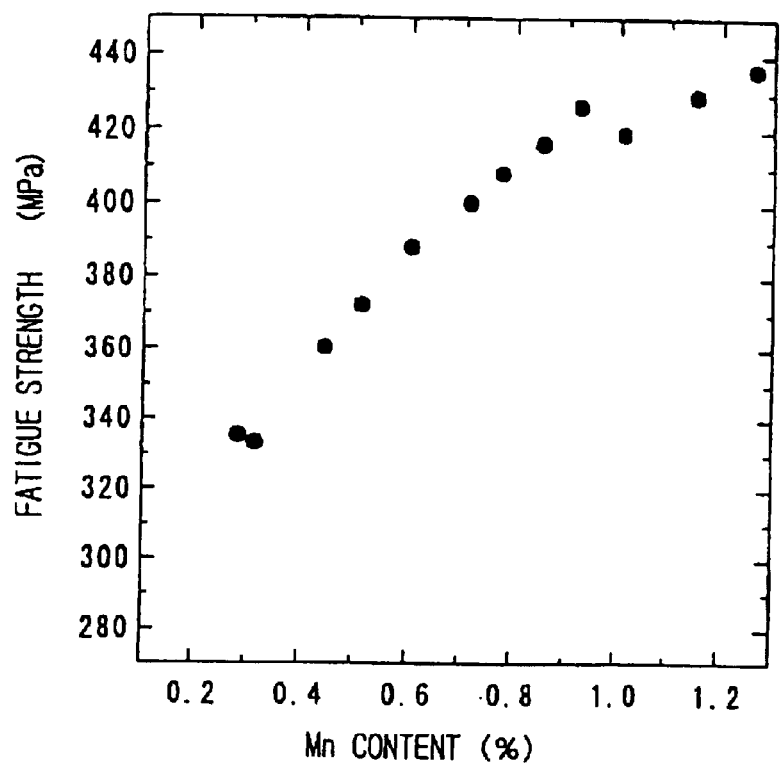
F I G. 5
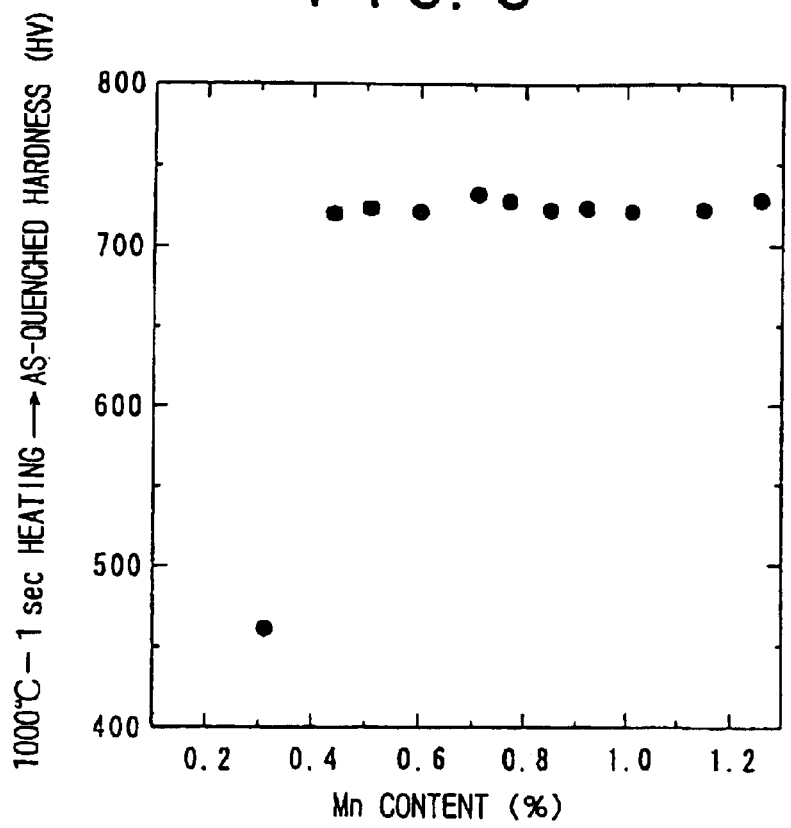
F I G. 6

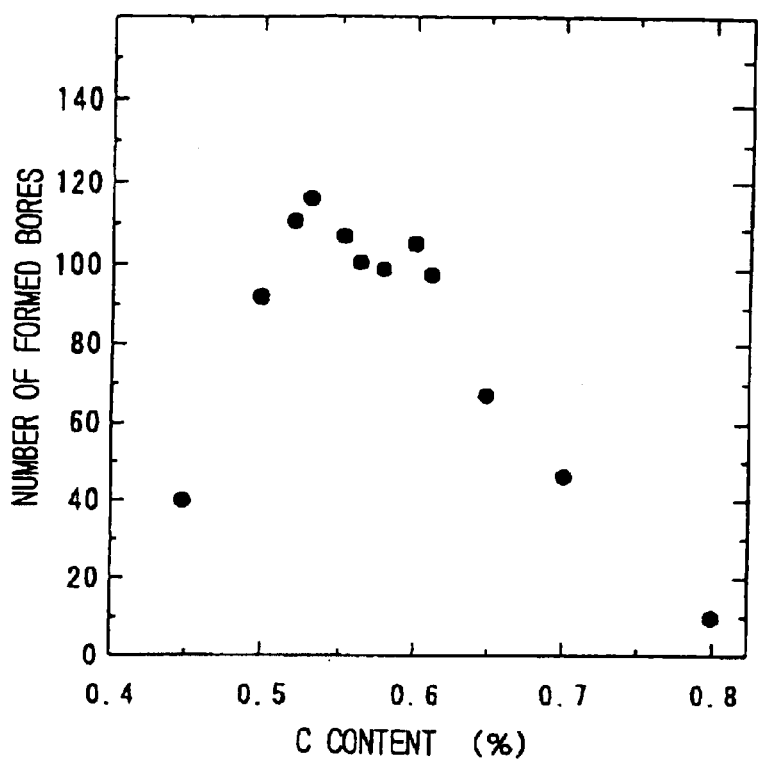
F I G. 10
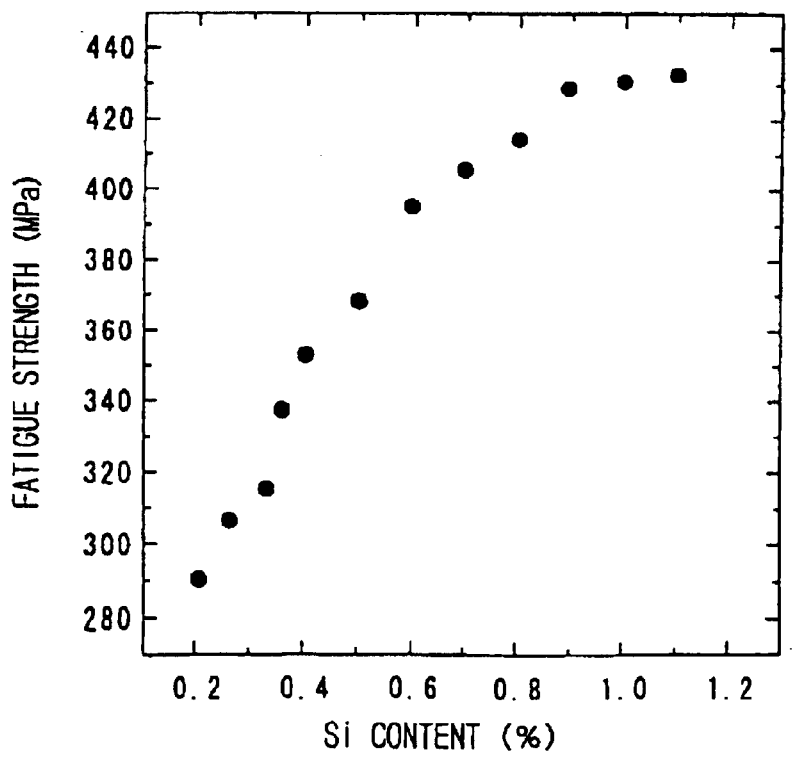
F I G. 11

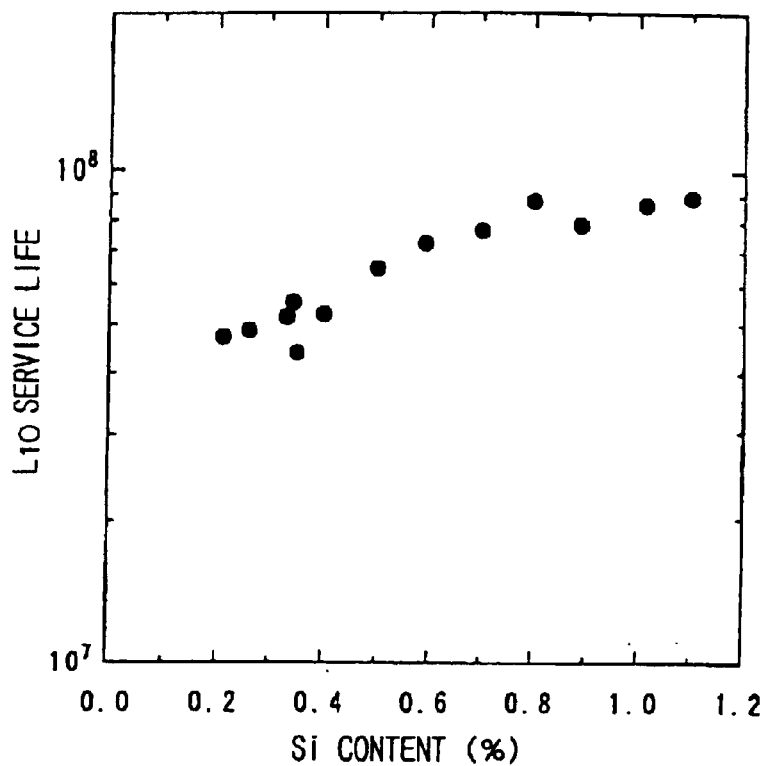
F I G. 12
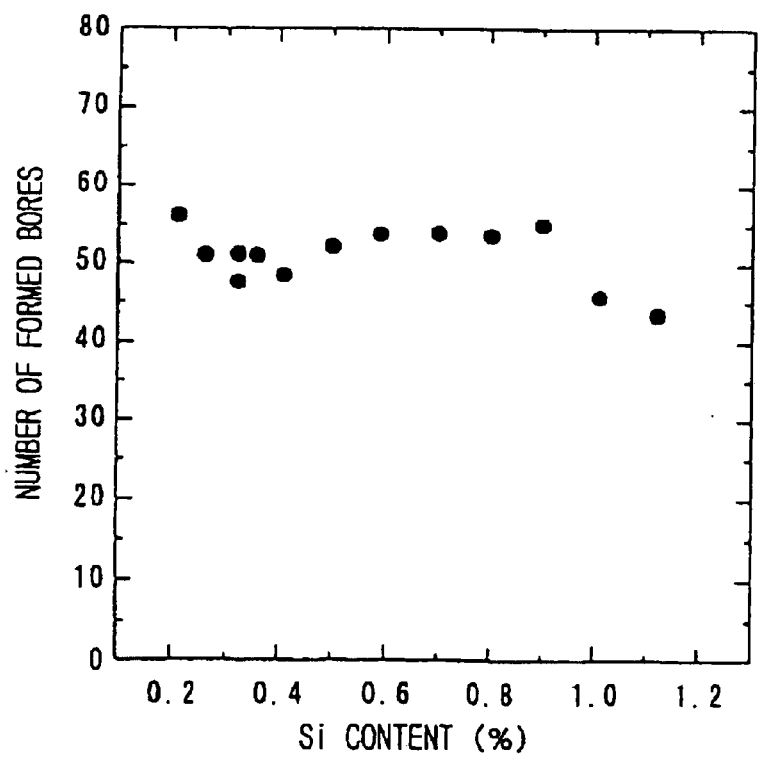
F I G. 13

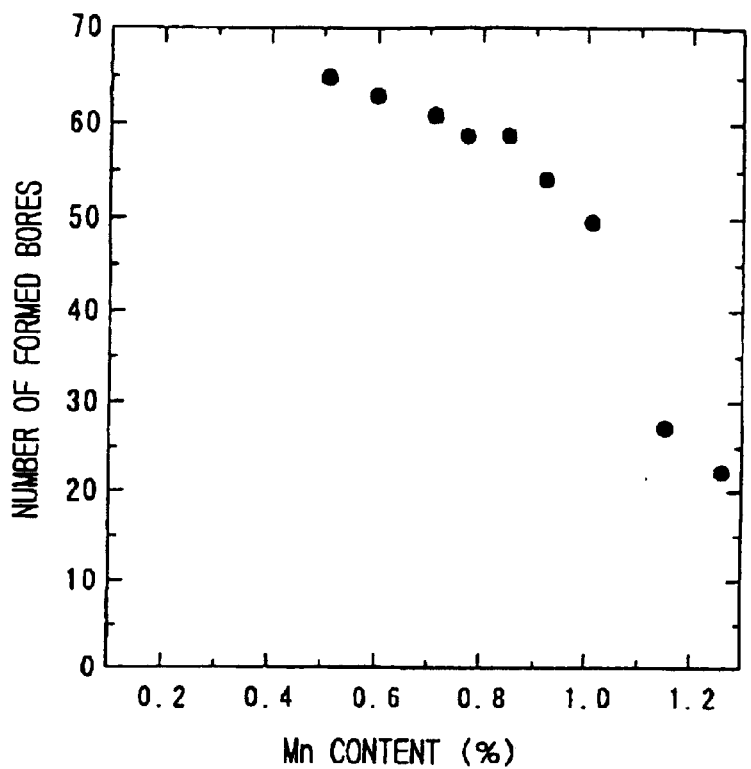
F I G. 16
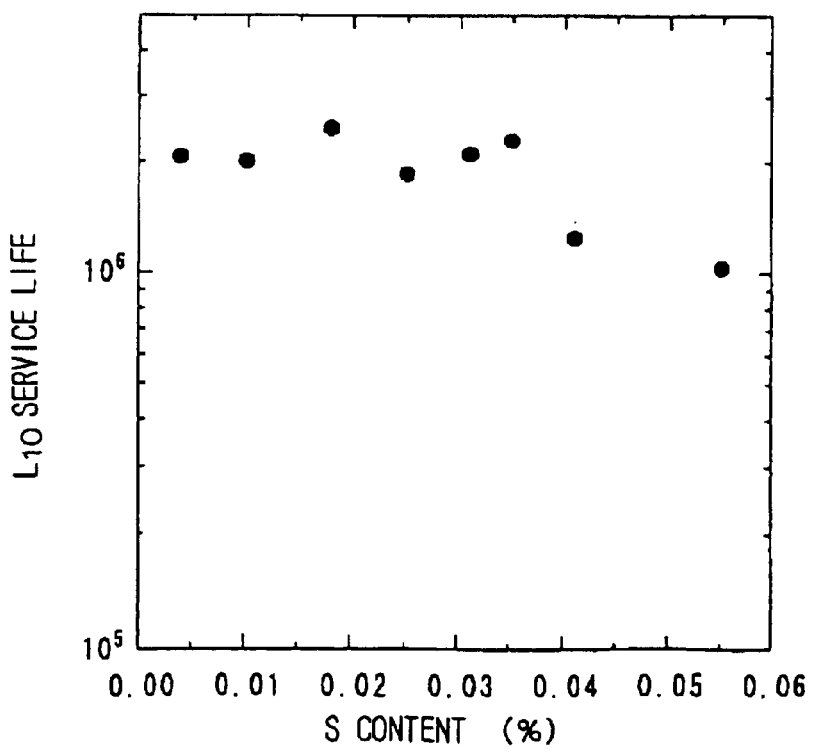
F I G. 17

HIGH STRENGTH STEEL FOR INDUCTION HARDENING

TECHNICAL FIELD

The present invention relates to a steel which is forged into a component a part of which is inductively hardened before use, for example, as constant velocity joints or hub units.

BACKGROUND ART

Components, for example, constant velocity joints or hub units, are produced by forming a steel product by cold forging, warm forging, or hot forging or a combination thereof and inductively hardening the forged product particularly in its portion required to have good strength. Steel products, such as JIS S 53 C, SAE 1055, and SAE 1070, are mainly used for such applications.

Due to a recent tendency toward an increase in severity of an environment under which the components are used, or a reduction in size and a reduction in thickness aimed at a reduction in weight, however, further improved rolling resistance level, abrasion resistance, and fatigue strength are required of the conventional quench-hardened portion. In addition, an improvement in fatigue strength in the non-hardened portion, in which the fatigue strength possessed by the as-forged component has hitherto sufficed for the contemplated applications, has also become required.

Further, in these components, there are many sites which undergo machining after casting, an ever-increasing demand in recent years for a reduction in working cost has led to a strong demand for improved machinability.

An increase in the content of carbon (C), silicon (Si), and chromium (Cr) or the addition of molybdenum or the like to improve the properties required of the hardened portion and, at the same time, an increase in fatigue strength of the nonhardened portion by increasing the hardness of the nonhardened portion are considered effective as means for meeting the above demands. Since, however, these components often undergo machining or cold working after forging, unconditionally increasing the hardness of the non-hardened portion is disadvantageous from the viewpoints of machining and cold working. Further, the addition of chromium and molybdenum leads to an increase in material cost. Further, hardening of a portion, which lacks in fatigue strength, is considered effective as means for improving the fatigue strength of the nonhardened portion. This, however, disadvantageously leads to an increase in the number of steps necessary for the production of components which in turn incurs increased production cost. For this reason, meeting a demand for an increase in fatigue strength of the nonhardened portion and a demand for an improvement in properties in the hardened portion while minimizing the increase in the hardness of the as-forged component to ensure machinability and cold workability of the nonhardened portion is required of materials used in these components.

DISCLOSURE OF THE INVENTION

It is an object of the present invention to solve the above problems of the prior art and to provide a steel product which, while minimizing an increase in as-forged hardness to ensure machinability and cold workability, is improved, for example, in fatigue strength in its non-hardened portion and is improved, in its hardened portion, in rolling resistance level, antipitting level, abrasion resistance, and fatigue strength.

First Invention

In order to solve the above object of the present invention, according to the first invention, there is provided a high strength steel for induction hardening comprising, by mass, carbon (C): 0.5 to 0.7%, silicon (Si): 0.5 to 1.0%, manganese (Mn): 0.5 to 1.0%, chromium (Cr): not more than 0.4%, and sulfur (S): not more than 0.035% with the balance consisting of iron (Fe) and unavoidable impurities, the steel being forged into a component a part of which is then inductively hardened before use.

Further, the present invention includes a component, produced by inductively casting at least a part of a product produced by casting the above steel for hardening, for example, a hub unit or a constant velocity joint.

In the above invention, the carbon content and the silicon content are preferably in the range of C: 0.5 to 0.6% and in the range of Si: 0.7 to 0.9%.

According to a preferred embodiment of the first invention, in the high strength steel for induction hardening, the equivalent of carbon $C_{eq}$ represented by formula (1) satisfies a requirement represented by formula (2):

$$C_{eq} = C\% + \frac{1}{7}Si\% + \frac{1}{5}Mn\% + \frac{1}{9}Cr\% - \frac{5}{7}S\% \quad (1)$$

$$0.75 \leq C_{eq} \leq 0.90 \quad (2)$$

Second Invention According to the second invention, there is provided a high strength steel for induction hardening, comprising, by mass, carbon (C): 0.5 to 0.7%, silicon (Si): 0.5 to 1.0%, manganese (Mn): 0.5 to 1.0%, chromium (Cr): not more than 0.4%, sulfur (S): not more than 0.035%, and vanadium (V): 0.01 to 0.15% with the balance consisting of iron (Fe) and unavoidable impurities, said steel being forged into a component a part of which is then inductively hardened before use.

Further, the present invention includes a component, produced by inductively hardening at least a part of a product produced by casting the above steel for hardening, for example, a hub unit or a constant velocity joint.

In the above invention, the carbon content and the silicon content are preferably in the range of C: 0.5 to 0.6% and in the range of Si: 0.7 to 0.9%.

According to a preferred embodiment of the second invention, in the high strength steel for induction hardening, the equivalent of carbon $C_{eq}$ represented by formula (1) satisfies a requirement represented by formula (2):

$$C_{eq} = C\% + \frac{1}{7}Si\% + \frac{1}{5}Mn\% + \frac{1}{9}Cr\% - \frac{5}{7}S\% + V\% \quad (1)$$

$$0.75 \leq C_{eq} \leq 0.90 \quad (2)$$

BRIEF DESCRIPTION OF THE DRAWINGS

FIG. 1 is a graph showing machinability in terms of the number of bores formed by drilling as a function of carbon content of a steel product in a drilling test;

FIG. 2 is a graph showing the relationship between silicon content of a steel product and fatigue strength in a rotating bending fatigue test;

FIG. 5 is a graph showing the relationship between manganese content of a steel product and fatigue strength in a rotating bending fatigue test;

FIG. 6 is a graph showing the relationship between manganese content of a steel product and as-quenched hardness in a short heating hardening test;

FIG. 10 is a graph showing machinability in terms of the number of bores formed by drilling as a function of carbon content of a steel product in a drilling test;

FIG. 11 is a graph showing the relationship between silicon content of a steel product and fatigue strength in a rotating bending fatigue test;

FIG. 12 is a graph showing the relationship between silicon content of a steel product and $L_{10}$ service life in a rolling service life test under a load in the radial direction;

FIG. 13 is a graph showing machinability in terms of the number of bores formed by drilling as a function of silicon content of a steel product in a drilling test;

FIG. 16 is a graph showing machinability in terms of the number of bores formed by drilling as a function of manganese content of a steel product in a drilling test;

FIG. 17 is a graph showing the relationship between sulfur content of a steel product and $L_{10}$ service life in a rolling service life test under a load in the direction of thrust;

DETAILED DESCRIPTION OF THE INVENTION

First Invention

Figure 3:
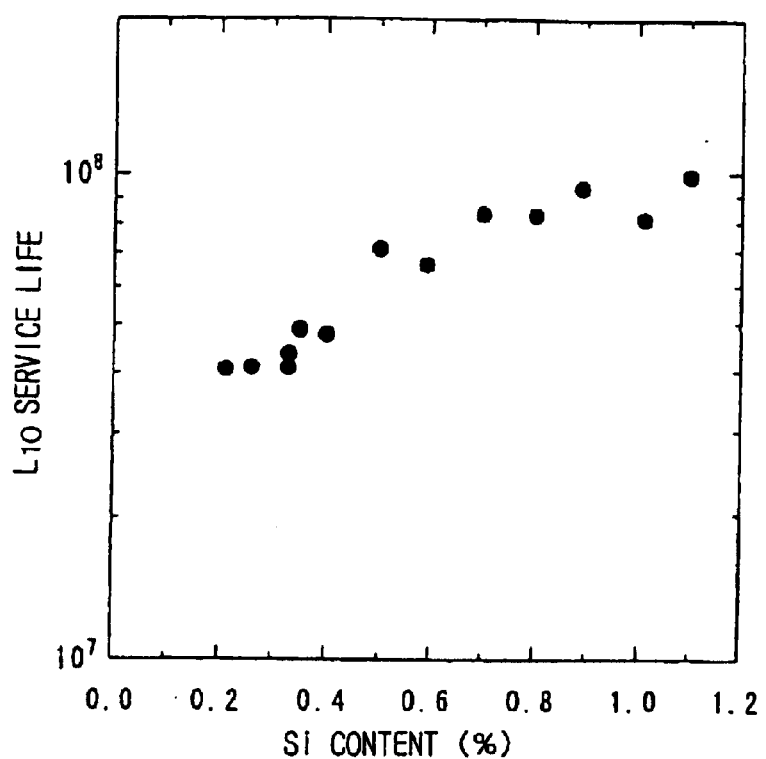
FIG. 3 is a graph showing the relationship between silicon content of a steel product and $L_{10}$ service life in a rolling service life test under a load in the radial direction.

The reason for the limitation of the chemical composition of the steel according to the first invention will be described. In the following description, % is by mass.

Carbon (C): 0.5 to 0.7%, Preferably 0.5 to 0.6%

Carbon is an element for ensuring the hardenability. The lower limit of the carbon content is 0.5% from the viewpoint of ensuring a hardness of not less than 60 HRC by conventional induction hardening and tempering. When the carbon content exceeds 0.7%, a large amount of retained austenite occurs at the time of quench hardening. This reduces the hardness effect attained by increasing the carbon content. Further, regarding the structure, proeutectoid ferrite in the nonhardened portion disappears, leading to a significant reduction in machinability. Except for the case where particularly high hardness is required, a carbon content of 0.5 to 0.6% is preferred from the viewpoint of leaving a satisfactory amount of proeutectoid ferrite and leaving room for the addition of other alloying elements to bring the carbon equivalent $C_{eq}$ to a target value.

Silicon (Si): 0.5 to 1.0%, Preferably 0.5 to 0.9%

The content of silicon is most important to the present invention, and silicon functions to improve fatigue strength and machinability and further contributes to an improvement in rolling resistance level, pitting resistance level, abrasion resistance, and fatigue strength in the hardened portion while minimizing the increase in hardness of the nonhardened portion. The addition of silicon in an amount of not less than 0.5% is useful for attaining the effect of improving the rolling resistance level, the pitting resistance level, the abrasion resistance, and the fatigue resistance in the hardened portion. When the amount of silicon added exceeds 1.0%, the contemplated effect is saturated. Regarding the machinability, the addition of silicon in an amount of 0.7 to 0.9% can offer the best effect.

Manganese (Mn): 0.5 to 1.0%

When the manganese content is lowered, the austenitization by heating for a short period of time in the induction hardening is unsatisfactory and, consequently, satisfactory as-quenched hardness cannot be provided. In the steel according to the present invention, the manganese content should be at least 0.5%. A manganese content of not less than 0.6% is preferred. Increasing the manganese content improves the fatigue strength of the nonhardened portion, but on the other hand, the amount of proeutectoid ferrite is reduced resulting in a significant reduction in machinability. For this reason, the upper limit of the manganese content is 1.0%.

Sulfur (S): Not More Than 0.035%

Sulfur is an element which functions to improve the machinability, and increasing the amount of sulfur added is advantageous from the viewpoint of machinability. Since, however, sulfur forms MnS as a nonmetallic inclusion, the rolling resistance level is deteriorated. Therefore, the upper limit of the sulfur content is 0.035% from the viewpoint of avoiding the influence of the addition of sulfur on the rolling resistance level.

Chromium (Cr): Not More Than 0.4%

Chromium may be added in a regulated amount to regulate the hardenability and the as-forged hardness. Chromium, however, concentrates in the cementite and, at the time of heating before hardening, inhibits the dissolution of carbon in the matrix to form a solid solution. This poses a problem at the time of heating for a short period of time in the induction hardening. For this reason, the chromium content should be not more than 0.4%.

Reason for adoption of $0.75 \leq C_{eq} \leq 0.90$

Figure 9:
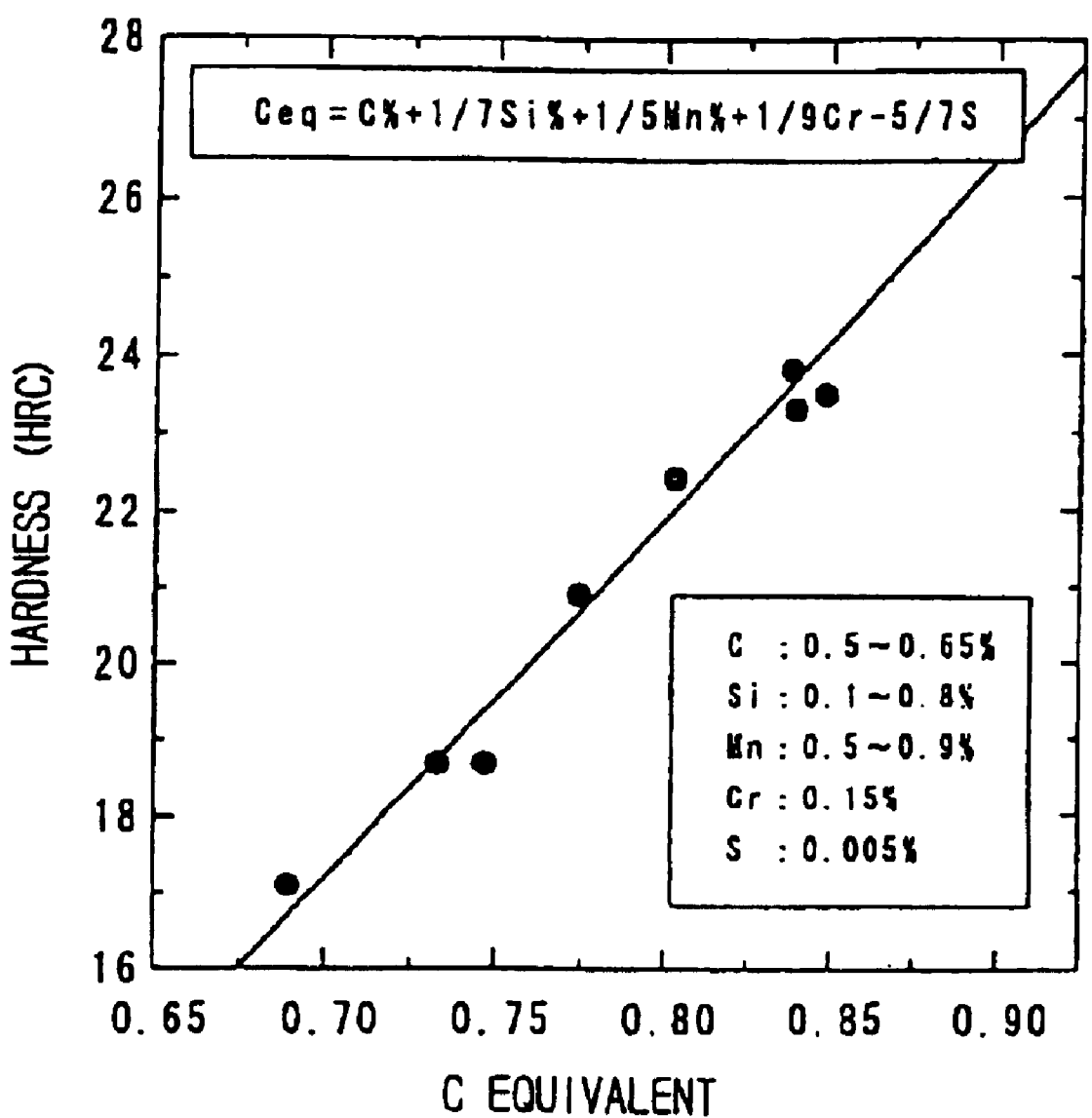
FIG. 9 is a graph showing the relationship between carbon equivalent and as-hot forged hardness.

The as-hot-forged hardness and the as-warm-forged hardness can be predicted from the carbon equivalent $C_{eq}$. A higher as-forged hardness is more advantageous from the viewpoint of the fatigue strength, but on the other hand, is more disadvantageous from the viewpoint of working. The relationship between the carbon equivalent and the as-hot-forged hardness was examined by experimentation on chemical compositions around the scope of the steel of the present invention. As a result, a relationship as shown in FIG. 9 was obtained. Specifically, when the carbon equivalent is $0.75 \leq C_{eq} \leq 0.90$, an as-hot-forged hardness of 19.5 to 26.5 HRC is obtained which can realize a combination of the contemplated fatigue strength in desired nonhardened portion with desired workability by conventional working method. Therefore, in the chemical composition of the steel, when the carbon equivalent $C_{eq}$ falls within the above defined range, a steel satisfying both workability and fatigue strength requirements can be surely produced. In particular, when the working process includes hot forging, the above defined carbon equivalent range is often preferred.

In the production of the steel according to the present invention, for example, from the viewpoint of mass production, a method may be preferably adopted wherein constituent metals are melted in an electric furnace, are refined, and, if necessary, are further degassed, followed by continuous casting.

Second Invention

The reason for the limitation of the chemical composition of the steel according to the second invention will be described. In the following description, % is by mass.

Carbon (C): 0.5 to 0.7%, Preferably 0.5 to 0.6%

Carbon is an element for ensuring the hardenability. The lower limit of the carbon content is 0.5% from the viewpoint of ensuring a hardness of not less than 60 HRC by conventional induction hardening and tempering. When the carbon content exceeds 0.7%, a large amount of retained austenite occurs at the time of quench hardening. This reduces the hardness effect attained by increasing the carbon content. Further, regarding the structure, proeutectoid ferrite in the nonhardened portion disappears, leading to a significant reduction in machinability. Except for the case where particularly high hardness is required, a carbon content of 0.5 to 0.6% is preferred from the viewpoint of leaving a satisfactory amount of proeutectoid ferrite and leaving room for the addition of other alloying elements to bring the carbon equivalent $C_{eq}$ to a target value.

Silicon (Si): 0.5 to 1.0%, Preferably 0.5 to 0.9%

The content of silicon is most important to the present invention, and silicon functions to improve fatigue strength and machinability and further contributes to an improvement in rolling resistance level, pitting resistance level, abrasion resistance, and fatigue strength in the hardened portion while minimizing the increase in hardness of the nonhardened portion. The addition of silicon in an amount of not less than 0.5% is useful for attaining the effect of improving the rolling resistance level, the pitting resistance level, the abrasion resistance, and the fatigue resistance in the hardened portion. When the amount of silicon added exceeds 1.0%, the contemplated effect is saturated. Regarding the machinability, the addition of silicon in an amount of 0.7 to 0.9% can offer the best effect.

Manganese (Mn): 0.5 to 1.0%

When the manganese content is lowered, the austenitization by heating for a short period of time in the induction hardening is unsatisfactory and, consequently, satisfactory as-quenched hardness cannot be provided. In the steel according to the present invention, the manganese content should be at least 0.5%. A manganese content of not less than 0.6% is preferred. Increasing the manganese content improves the fatigue strength of the nonhardened portion, but on the other hand, the amount of proeutectoid ferrite is reduced resulting in a significant reduction in machinability. For this reason, the upper limit of the manganese content is 1.0%.

Sulfur (S): Not More Than 0.035%

Sulfur is an element which functions to improve the machinability, and increasing the amount of sulfur added is advantageous from the viewpoint of machinability. Since, however, sulfur forms MnS as a nonmetallic inclusion, the rolling resistance level is deteriorated. Therefore, the upper limit of the sulfur content is 0.035% from the viewpoint of avoiding the influence of the addition of sulfur on the rolling resistance level.

Chromium (Cr): Not More Than 0.4%

Chromium may be added in a regulated amount to regulate the hardenability and the as-forged hardness. Chromium, however, concentrates in the cementite and, at the time of heating before hardening, inhibits the dissolution of carbon in the matrix to form a solid solution. This poses a problem at the time of heating for a short period of time in the induction hardening. For this reason, the chromium content should be not more than 0.4%.

Vanadium (V): 0.01 to 0.15%

Vanadium, together with silicon, plays an important role in the present invention and contributes to an improvement in fatigue strength of the nonhardened portion and an improvment in machinability. The addition of vanadium permits proeutectoid ferrite, which is the weakest portion in the structure, to be strengthened by precipitation hardening of VC, and, as a result, the fatigue strength is improved. Further, proeutectoid ferrite is stably precipitated in a spheroidal form using VN, which is produced by the addition of vanadium, as a nucleus to significantly improve the machinability. When the carbon content is not more than 0.5%, despite the addition of vanadium, proeutectoid ferrite is precipitated in a satisfactory amount although the proeutectoid ferrite is precipitated in a layer form. Therefore, in this case, the effect of improving the machinability cannot be substantially attained by the addition of vanadium. On the other hand, when the carbon content is not less than 0.7%, the proeutectoid ferrite is hardly precipitated by the addition of vanadium and, consequently, the effect of improving the machinability cannot be attained. Only in the carbon content range of 0.5 to 0.7% which causes the precipitation of a slight amount of layered proeutectoid ferrite and is unsatisfactory in the machinability, the machinability can be improved by adding vanadium to stably precipitate spheroidal proeutectoid ferrite. Increasing the amount of vanadium added, however, increases the hardness and thus deteriorates the machinability. For this reason, the upper limit of the vanadium content is 0.15%.

Reason for Adoption of $0.75 \leq C_{eq} \leq 0.90$

Figure 20:
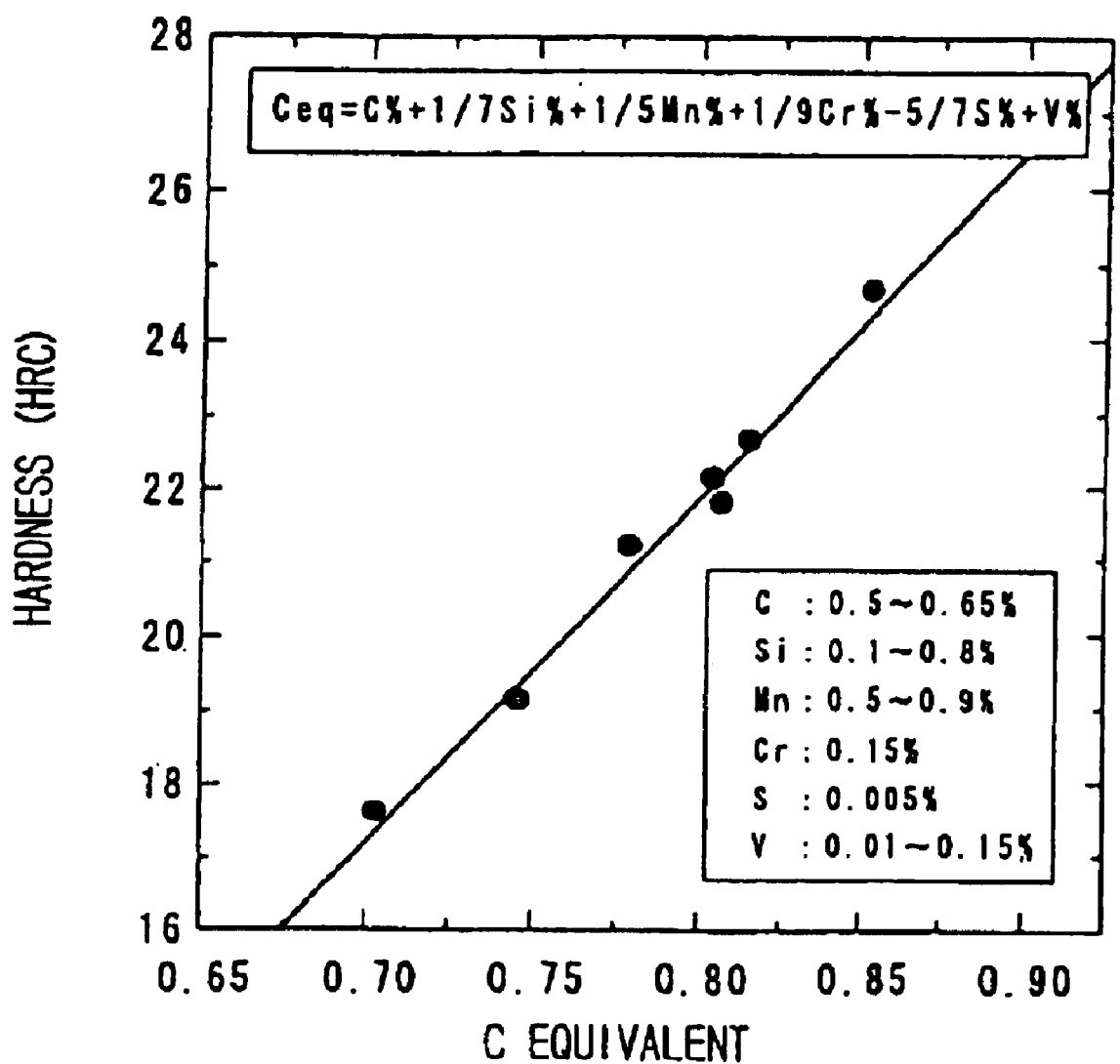
FIG. 20 is a graph showing the relationship between carbon equivalent and as-hot-forged hardness.

The as-hot-forged hardness and the as-warm-forged hardness can be predicted from the carbon equivalent $C_{eq}$. A higher as-forged hardness is more advantageous from the viewpoint of the fatigue strength, but on the other hand, is more disadvantageous from the viewpoint of working. The relationship between the carbon equivalent and the as-hot-forged hardness was examined by experimentation on chemical compositions around the scope of the steel of the present invention. As a result, a relationship as shown in FIG. 20 was obtained. Specifically, when the carbon equivalent is $0.75 \leq C_{eq} \leq 0.90$, an as-hot-forged hardness of 19.5 to 26.5 HRC is obtained which can realize a combination of the contemplated fatigue strength in desired nonhardened portion with desired workability by conventional working method. Therefore, in the chemical composition of the steel, when the carbon equivalent $C_{eq}$ falls within the above defined range, a steel satisfying both workability and fatigue strength requirements can be surely produced. In particular, when the working process includes hot forging, the above defined carbon equivalent range is often preferred.

In the production of the steel according to the present invention, for example, from the viewpoint of mass production, a method may be preferably adopted wherein constituent metals are melted in an electric furnace, are refined, and, if necessary, are further degassed, followed by continuous casting.

EXAMPLES

Example A

Preferred embodiments of the present invention will be described with reference to the following examples. 100 kg of test steels having chemical compositions shown in Tables 1 and 2 were produced by VIM (vacuum induction melting). In this connection, it should be noted that phosphorus (P), nickel (Ni), molybdenum (Mo), oxygen (O), and nitrogen (N) in the chemical compositions of the test steels are elements which are unavoidably contained as impurities. The steels thus obtained are cogged by hot forging to a predetermined dimension and are then machined to prepare specimens of Example A.

TABLE A1

(mass %; O and N in ppm)

|  | C | Si | Mn | P | S | Ni | Cr | Mo | O | N |
|---|---|---|---|---|---|---|---|---|---|---|
| Heat A1 | 0.50 | 0.81 | 0.80 | 0.014 | 0.016 | 0.05 | 0.15 | 0.01 | 11 | 153 |
| Heat A2 | 0.52 | 0.80 | 0.79 | 0.014 | 0.015 | 0.06 | 0.15 | 0.01 | 10 | 144 |
| Heat A3 | 0.53 | 0.80 | 0.80 | 0.015 | 0.016 | 0.05 | 0.16 | 0.01 | 8 | 149 |
| Heat A4 | 0.55 | 0.78 | 0.81 | 0.015 | 0.015 | 0.06 | 0.15 | 0.01 | 10 | 140 |
| Heat A5 | 0.56 | 0.81 | 0.80 | 0.014 | 0.015 | 0.06 | 0.16 | 0.02 | 9 | 139 |
| Heat A6 | 0.58 | 0.80 | 0.78 | 0.014 | 0.014 | 0.05 | 0.15 | 0.01 | 9 | 144 |
| Heat A7 | 0.60 | 0.82 | 0.80 | 0.015 | 0.015 | 0.05 | 0.16 | 0.01 | 11 | 137 |
| Heat A8 | 0.61 | 0.80 | 0.80 | 0.014 | 0.016 | 0.05 | 0.15 | 0.01 | 8 | 131 |
| Heat A9 | 0.65 | 0.80 | 0.80 | 0.015 | 0.016 | 0.06 | 0.16 | 0.01 | 9 | 144 |
| Heat A10 | 0.70 | 0.81 | 0.80 | 0.015 | 0.017 | 0.06 | 0.16 | 0.01 | 10 | 130 |
| Heat A11 | 0.54 | 0.21 | 0.80 | 0.015 | 0.016 | 0.05 | 0.15 | 0.02 | 9 | 135 |
| Heat A12 | 0.55 | 0.26 | 0.81 | 0.015 | 0.014 | 0.05 | 0.15 | 0.01 | 7 | 139 |
| Heat A13 | 0.54 | 0.33 | 0.80 | 0.015 | 0.015 | 0.05 | 0.15 | 0.01 | 8 | 141 |
| Heat A14 | 0.55 | 0.33 | 0.81 | 0.014 | 0.015 | 0.04 | 0.16 | 0.01 | 8 | 136 |
| Heat A15 | 0.55 | 0.35 | 0.80 | 0.014 | 0.015 | 0.05 | 0.15 | 0.01 | 9 | 150 |
| Heat A16 | 0.55 | 0.40 | 0.79 | 0.014 | 0.016 | 0.06 | 0.15 | 0.01 | 8 | 148 |
| Heat A17 | 0.56 | 0.50 | 0.79 | 0.015 | 0.014 | 0.05 | 0.15 | 0.01 | 7 | 148 |
| Heat A18 | 0.55 | 0.59 | 0.78 | 0.014 | 0.015 | 0.05 | 0.15 | 0.01 | 10 | 139 |
| Heat A19 | 0.55 | 0.70 | 0.81 | 0.015 | 0.015 | 0.06 | 0.15 | 0.01 | 8 | 148 |
| Heat A20 | 0.54 | 0.80 | 0.79 | 0.014 | 0.015 | 0.06 | 0.15 | 0.01 | 7 | 145 |
| Heat A21 | 0.54 | 0.89 | 0.81 | 0.014 | 0.016 | 0.05 | 0.15 | 0.02 | 10 | 151 |
| Heat A22 | 0.54 | 1.01 | 0.81 | 0.015 | 0.015 | 0.06 | 0.15 | 0.01 | 7 | 142 |
| Heat A23 | 0.55 | 1.10 | 0.79 | 0.014 | 0.016 | 0.05 | 0.16 | 0.01 | 8 | 144 |

TABLE A2

(mass %; O and N in ppm)

|  | C | Si | Mn | P | S | Ni | Cr | Mo | O | N |
|---|---|---|---|---|---|---|---|---|---|---|
| Heat A24 | 0.56 | 0.8 | 0.28 | 0.015 | 0.015 | 0.05 | 0.15 | 0.01 | 8 | 147 |
| Heat A25 | 0.55 | 0.8 | 0.31 | 0.015 | 0.015 | 0.05 | 0.15 | 0.01 | 8 | 146 |
| Heat A26 | 0.54 | 0.81 | 0.44 | 0.014 | 0.016 | 0.06 | 0.16 | 0.01 | 7 | 143 |
| Heat A27 | 0.56 | 0.81 | 0.51 | 0.015 | 0.015 | 0.05 | 0.15 | 0.01 | 7 | 149 |
| Heat A28 | 0.55 | 0.8 | 0.6 | 0.014 | 0.015 | 0.06 | 0.15 | 0.02 | 10 | 150 |
| Heat A29 | 0.55 | 0.81 | 0.71 | 0.015 | 0.016 | 0.05 | 0.16 | 0.01 | 9 | 151 |
| Heat A30 | 0.54 | 0.81 | 0.77 | 0.014 | 0.014 | 0.06 | 0.15 | 0.01 | 9 | 148 |
| Heat A31 | 0.55 | 0.82 | 0.85 | 0.015 | 0.016 | 0.06 | 0.15 | 0.01 | 8 | 153 |
| Heat A32 | 0.56 | 0.8 | 0.92 | 0.014 | 0.016 | 0.05 | 0.15 | 0.02 | 9 | 144 |
| Heat A33 | 0.54 | 0.81 | 1.01 | 0.015 | 0.016 | 0.05 | 0.16 | 0.01 | 7 | 143 |
| Heat A34 | 0.55 | 0.78 | 1.15 | 0.015 | 0.015 | 0.06 | 0.14 | 0.01 | 7 | 139 |
| Heat A35 | 0.54 | 0.8 | 1.26 | 0.015 | 0.015 | 0.05 | 0.15 | 0.01 | 8 | 143 |
| Heat A36 | 0.55 | 0.79 | 0.8 | 0.015 | 0.004 | 0.05 | 0.16 | 0.01 | 8 | 144 |
| Heat A37 | 0.54 | 0.8 | 0.81 | 0.015 | 0.01 | 0.06 | 0.15 | 0.01 | 9 | 158 |
| Heat A38 | 0.54 | 0.82 | 0.8 | 0.015 | 0.018 | 0.05 | 0.15 | 0.01 | 7 | 140 |
| Heat A39 | 0.55 | 0.8 | 0.79 | 0.015 | 0.025 | 0.05 | 0.14 | 0.01 | 7 | 146 |
| Heat A40 | 0.56 | 0.83 | 0.8 | 0.015 | 0.031 | 0.06 | 0.15 | 0.02 | 9 | 140 |
| Heat A41 | 0.54 | 0.8 | 0.8 | 0.015 | 0.035 | 0.05 | 0.15 | 0.01 | 10 | 143 |
| Heat A42 | 0.55 | 0.8 | 0.79 | 0.015 | 0.041 | 0.05 | 0.15 | 0.01 | 8 | 140 |
| Heat A43 | 0.53 | 0.79 | 0.79 | 0.014 | 0.055 | 0.06 | 0.15 | 0.01 | 9 | 144 |

In the above test steels, ten steels of heat A1 to heat A10 shown in Table A1 are test steels used in the evaluation in carbon contents shown in FIG. 1, and, for heat A8, heat A9, and heat A10, the carbon content is outside the preferred carbon content range specified in the present invention. Thirteen steels of heat A11 to heat A23 shown in Table A1 are test steels used in evaluation in silicon contents shown in FIGS. 2, 3, and 4, wherein, for heat A11 to heat A16, the silicon content is below the lower limit of the silicon content range specified in the present invention and, for heat A22 and heat A23, the silicon content is above the upper limit of the silicon content range specified in the present invention. Further, twelve steels of heat A24 to heat A35 shown in Table A2 are test steels used in evaluation in manganese contents shown in FIGS. 5, 6, and 7, wherein, for heat A24 to heat A26, the manganese content is below the lower limit of the manganese content range specified in the present invention and, for heat A33 to heat A35, the manganese content is above the upper limit of the manganese content range specified in the present invention. Furthermore, eight steels of heat A36 to heat A43 shown in Table A2 are test steels used in evaluation in sulfur contents shown in FIG. 8, wherein, for heat A42 and heat A43, the sulfur content is above the upper limit of the sulfur content range specified in the present invention. The specimens of the test steels were subjected to the following tests. The results are shown in the drawings.

① Machinability (Drill Service Life Test)

A hot forged material of 30 mmϕ was worked by a milling machine to prepare a rectangular material having a size of 24 mm×18 mm×300 mm which was then subjected to a drilling test, and the machinability was evaluated in terms of the number of bores which could be formed by drilling until the drill failed. Testing conditions in each drawing are as follows. Diameter of drill: 5 mmϕ; material of drill: SKH 51; cutting speed: 20 m/min; feed rate: 0.2 mm/rev; cutting oil: not used (dry type); bore depth: 15 mm; and evaluation method: number of bores which could be formed until the drill no longer could form a bore.

As is apparent from FIG. 1, the machinability deteriorates with increasing the carbon content, and rapidly deteriorates when the carbon content exceeds 0.6%.

Figure 4:
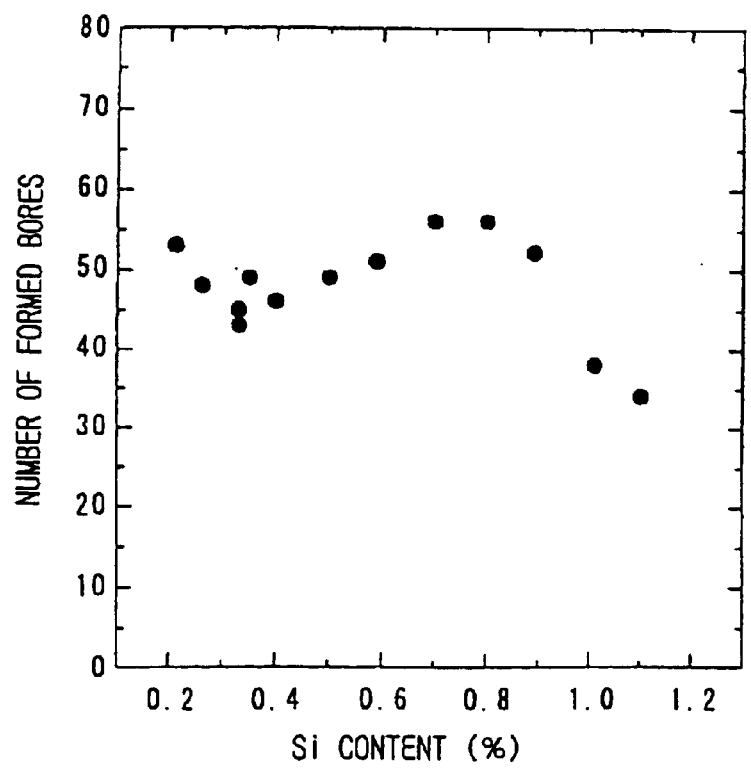
FIG. 4 is a graph showing machinability in terms of the number of bores formed by drilling as a function of silicon content of a steel product in a drilling test.

As is apparent from FIG. 4, a silicon content of not more than 1% has no significant influence on the machinability. When the silicon content is 0.7 to 0.9%, the best machinability can be provided. When the silicon content exceeds 1%, the machinability is rapidly deteriorated.

Figure 7:
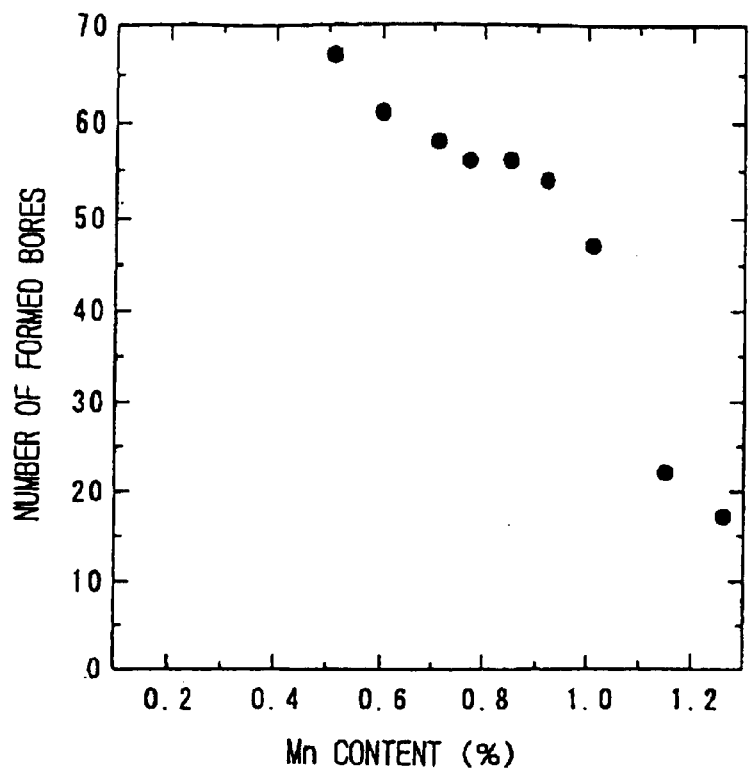
FIG. 7 is a graph showing machinability in terms of the number of bores formed by drilling as a function of manganese content of a steel product in a drilling test.

As is apparent from FIG. 7, the machinability deteriorates with increasing the manganese content. When the manganese content exceeds 1%, the machinability is particularly significantly deteriorated.

② Fatigue test (rotating bending fatigue test)

A hot forged material of 20 mmϕ was machined to prepare a specimen, for a rotating bending fatigue test, having a test portion size of 8 mmϕ, and the specimen was subjected to a rotating bending fatigue test to evaluate the fatigue strength.

As is apparent from FIG. 2, the fatigue strength improves with increasing the silicon content.

As is apparent from FIG. 5, the fatigue strength improves with increasing the manganese content.

③ Rolling Service Life Test (Radial Load)

A forged material of 20 mmϕ was machined to prepare a specimen having a size of 12 mmϕ×22 mm. The specimen was inductively hardened, was tempered, was surface polished, and was then subjected to a rolling service life test. The test was carried out under conditions of Pmax=5880 MPa, load=radial direction, and temperature=room temperature. As can be seen from FIG. 3, the rolling service life test was evaluated in terms of $L_{10}$ service life.

As is apparent from FIG. 3, the rolling service life improves with increasing the silicon content. The effect is large when the silicon content is not less than 0.5%.

④ Rolling Service Life Test (Thrust Load)

A forged material of 65 mmϕ was machined to prepare a specimen having a size of 60 mmϕ×7.2 mm. The specimen was inductively hardened, was tempered, was surface polished, and was then subjected to a rolling service life test. The test was carried out under conditions of Pmax=5292 MPa, load=thrust direction, and temperature=room temperature. As can be seen from FIG. 8, the rolling service life test was evaluated in terms of $L_{10}$ service life.

Figure 8:
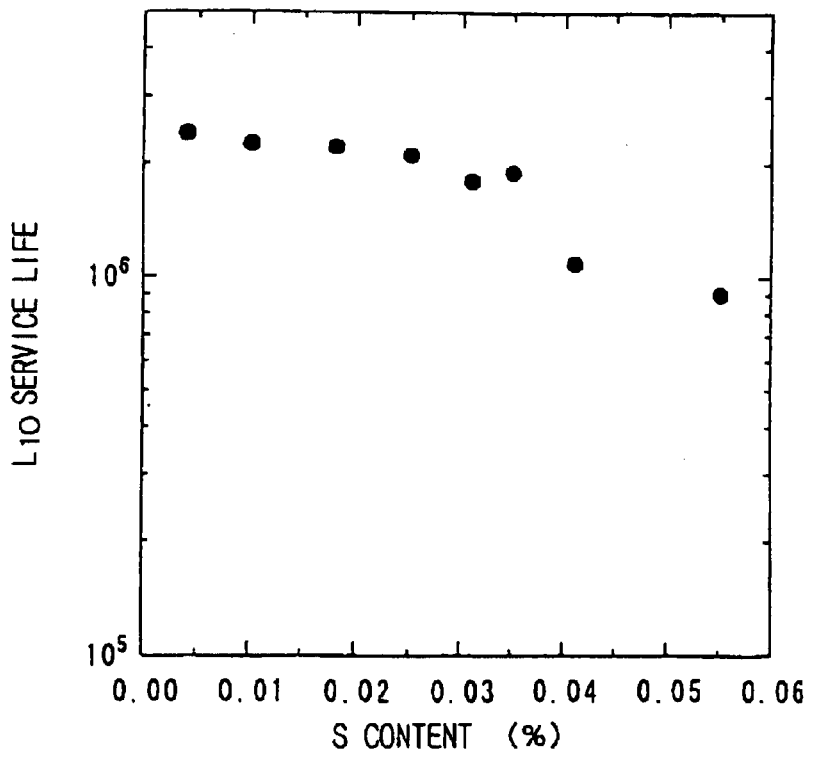
FIG. 8 is a graph showing the relationship between sulfur content of a steel product and $L_{10}$ service life in a rolling service life test under a load in the direction of thrust.

As is apparent from FIG. 8, when the sulfur content exceeds 0.035%, the rolling service life begins to deteriorate.

⑤ Short Heating Hardening Test

A specimen having a size of 3 mmϕ×10 mm was taken off from a hot forged material having a size of 30 mmϕ, was heated at 1000° C. for one sec, was rapidly cooled by helium gas, and was measured for as-quenched hardness.

As is apparent from FIG. 6, when the manganese content was less than 0.4%, the austenitization was unsatisfactory and, thus, the hardness was unsatisfactory.

As is apparent from the foregoing description, according to the present invention, the carbon content and the manganese content are limited to such a level that does not deteriorate the workability, while the silicon content is increased to increase the strength. By virtue of this construction, the present invention can provide a high strength steel product for induction hardening, which has unprecedentedly excellent properties, that is, while minimizing an increase in hardness after forging to ensure machinability and cold workability, is improved, for example, in fatigue strength in its nonhardened portion and, in addition, in its hardened portion, is improved in rolling resistance level, rolling service life, antipitting level, abrasion resistance, and fatigue strength, the steel product being forged into a component a part of which is then inductively hardened before use.

Example B

Preferred embodiments of the present invention will be described with reference to the following examples. 100 kg of test steels having chemical compositions shown in Tables 1 and 2 were produced by VIM (vacuum induction melting). In this connection, it should be noted that phosphorus (P), nickel (Ni), molybdenum (Mo), oxygen (O), and nitrogen (N) in the chemical compositions of the test steels are elements which are unavoidably contained as impurities. The steels thus obtained are cogged by hot forging to a predetermined dimension and are then machined to prepare specimens of Example B.

TABLE B1

| | (mass %; O and N in ppm) | | | | | | | | | |
|---|---|---|---|---|---|---|---|---|---|---|
| | C | Si | Mn | P | S | Ni | Cr | Mo | O | N | V |
| Heat B1 | 0.50 | 0.66 | 0.60 | 0.014 | 0.031 | 0.05 | 0.15 | 0.01 | 11 | 153 | 0.10 |
| Heat B2 | 0.52 | 0.65 | 0.61 | 0.014 | 0.031 | 0.06 | 0.15 | 0.01 | 10 | 144 | 0.09 |
| Heat B3 | 0.53 | 0.65 | 0.60 | 0.015 | 0.030 | 0.05 | 0.16 | 0.01 | 8 | 149 | 0.10 |
| Heat B4 | 0.55 | 0.65 | 0.60 | 0.015 | 0.030 | 0.06 | 0.15 | 0.01 | 10 | 140 | 0.10 |
| Heat B5 | 0.56 | 0.66 | 0.61 | 0.014 | 0.029 | 0.06 | 0.16 | 0.02 | 9 | 139 | 0.11 |
| Heat B6 | 0.58 | 0.65 | 0.60 | 0.014 | 0.030 | 0.05 | 0.15 | 0.01 | 9 | 144 | 0.10 |
| Heat B7 | 0.60 | 0.64 | 0.59 | 0.015 | 0.030 | 0.05 | 0.16 | 0.01 | 11 | 137 | 0.09 |
| Heat B8 | 0.61 | 0.64 | 0.60 | 0.014 | 0.030 | 0.05 | 0.15 | 0.01 | 8 | 131 | 0.10 |
| Heat B9 | 0.65 | 0.65 | 0.60 | 0.015 | 0.030 | 0.06 | 0.16 | 0.01 | 9 | 144 | 0.11 |
| Heat B10 | 0.70 | 0.65 | 0.58 | 0.015 | 0.030 | 0.06 | 0.16 | 0.01 | 10 | 130 | 0.10 |
| Heat B11 | 0.54 | 0.21 | 0.60 | 0.015 | 0.030 | 0.05 | 0.15 | 0.02 | 9 | 135 | 0.10 |

TABLE B1-continued (mass %; O and N in ppm)

| | C | Si | Mn | P | S | Ni | Cr | Mo | O | N | V |
|---|---|---|---|---|---|---|---|---|---|---|---|
| Heat B12 | 0.55 | 0.26 | 0.61 | 0.015 | 0.030 | 0.05 | 0.15 | 0.01 | 7 | 139 | 0.11 |
| Heat B13 | 0.54 | 0.33 | 0.61 | 0.015 | 0.031 | 0.05 | 0.15 | 0.01 | 8 | 141 | 0.08 |
| Heat B14 | 0.55 | 0.33 | 0.61 | 0.014 | 0.030 | 0.04 | 0.16 | 0.01 | 8 | 136 | 0.09 |
| Heat B15 | 0.55 | 0.35 | 0.60 | 0.014 | 0.030 | 0.05 | 0.15 | 0.01 | 9 | 150 | 0.10 |
| Heat B16 | 0.55 | 0.40 | 0.60 | 0.014 | 0.030 | 0.06 | 0.15 | 0.01 | 8 | 148 | 0.10 |
| Heat B17 | 0.56 | 0.50 | 0.60 | 0.015 | 0.031 | 0.05 | 0.15 | 0.01 | 7 | 148 | 0.10 |
| Heat B18 | 0.55 | 0.59 | 0.61 | 0.014 | 0.032 | 0.05 | 0.15 | 0.01 | 10 | 139 | 0.11 |
| Heat B19 | 0.55 | 0.70 | 0.60 | 0.015 | 0.031 | 0.06 | 0.15 | 0.01 | 8 | 148 | 0.10 |
| Heat B20 | 0.54 | 0.80 | 0.62 | 0.014 | 0.030 | 0.06 | 0.15 | 0.01 | 7 | 145 | 0.10 |
| Heat B21 | 0.54 | 0.89 | 0.60 | 0.014 | 0.031 | 0.05 | 0.15 | 0.02 | 10 | 151 | 0.10 |
| Heat B22 | 0.54 | 1.01 | 0.60 | 0.015 | 0.031 | 0.06 | 0.15 | 0.01 | 7 | 142 | 0.10 |
| Heat B23 | 0.55 | 1.10 | 0.60 | 0.014 | 0.030 | 0.05 | 0.16 | 0.01 | 8 | 144 | 0.09 |

TABLE B2

(mass %; O and N in ppm)

| | C | Si | Mn | P | S | Ni | Cr | Mo | O | N | V |
|---|---|---|---|---|---|---|---|---|---|---|---|
| Heat B24 | 0.56 | 0.65 | 0.28 | 0.015 | 0.030 | 0.05 | 0.15 | 0.01 | 8 | 147 | 0.09 |
| Heat B25 | 0.55 | 0.65 | 0.31 | 0.015 | 0.029 | 0.05 | 0.15 | 0.01 | 8 | 146 | 0.10 |
| Heat B26 | 0.54 | 0.65 | 0.44 | 0.014 | 0.031 | 0.06 | 0.16 | 0.01 | 7 | 143 | 0.10 |
| Heat B27 | 0.56 | 0.65 | 0.51 | 0.015 | 0.031 | 0.05 | 0.15 | 0.01 | 7 | 149 | 0.10 |
| Heat B28 | 0.55 | 0.65 | 0.60 | 0.014 | 0.030 | 0.06 | 0.15 | 0.02 | 10 | 150 | 0.10 |
| Heat B29 | 0.55 | 0.65 | 0.71 | 0.015 | 0.029 | 0.05 | 0.16 | 0.01 | 9 | 151 | 0.11 |
| Heat B30 | 0.54 | 0.66 | 0.77 | 0.014 | 0.028 | 0.06 | 0.15 | 0.01 | 9 | 148 | 0.11 |
| Heat B31 | 0.55 | 0.66 | 0.85 | 0.015 | 0.030 | 0.05 | 0.15 | 0.01 | 8 | 153 | 0.10 |
| Heat B32 | 0.56 | 0.65 | 0.92 | 0.014 | 0.031 | 0.05 | 0.15 | 0.02 | 9 | 144 | 0.09 |
| Heat B33 | 0.54 | 0.67 | 1.01 | 0.015 | 0.030 | 0.05 | 0.16 | 0.01 | 7 | 143 | 0.10 |
| Heat B34 | 0.55 | 0.64 | 1.15 | 0.015 | 0.030 | 0.06 | 0.14 | 0.01 | 7 | 139 | 0.10 |
| Heat B35 | 0.54 | 0.65 | 1.26 | 0.015 | 0.030 | 0.05 | 0.15 | 0.01 | 8 | 143 | 0.10 |
| Heat B36 | 0.55 | 0.65 | 0.61 | 0.015 | 0.004 | 0.05 | 0.16 | 0.01 | 8 | 144 | 0.11 |
| Heat B37 | 0.54 | 0.64 | 0.59 | 0.015 | 0.010 | 0.06 | 0.15 | 0.01 | 9 | 158 | 0.10 |
| Heat B38 | 0.54 | 0.64 | 0.60 | 0.015 | 0.018 | 0.05 | 0.15 | 0.01 | 7 | 140 | 0.80 |
| Heat B39 | 0.55 | 0.65 | 0.60 | 0.015 | 0.025 | 0.05 | 0.14 | 0.01 | 7 | 146 | 0.09 |
| Heat B40 | 0.56 | 0.64 | 0.60 | 0.015 | 0.031 | 0.06 | 0.15 | 0.02 | 9 | 140 | 0.11 |
| Heat B41 | 0.54 | 0.64 | 0.61 | 0.015 | 0.035 | 0.05 | 0.15 | 0.01 | 10 | 143 | 0.10 |
| Heat B42 | 0.55 | 0.65 | 0.61 | 0.015 | 0.041 | 0.05 | 0.15 | 0.01 | 8 | 140 | 0.10 |
| Heat B43 | 0.53 | 0.65 | 0.60 | 0.014 | 0.055 | 0.06 | 0.15 | 0.01 | 9 | 144 | 0.10 |
| Heat B44 | 0.56 | 0.65 | 0.60 | 0.015 | 0.031 | 0.05 | 0.15 | 0.01 | 8 | 150 | 0.00 |
| Heat B45 | 0.55 | 0.64 | 0.61 | 0.015 | 0.029 | 0.06 | 0.15 | 0.01 | 7 | 143 | 0.02 |
| Heat B46 | 0.56 | 0.64 | 0.61 | 0.014 | 0.028 | 0.06 | 0.16 | 0.01 | 8 | 147 | 0.04 |
| Heat B47 | 0.56 | 0.66 | 0.62 | 0.013 | 0.031 | 0.06 | 0.16 | 0.02 | 9 | 146 | 0.07 |
| Heat B48 | 0.55 | 0.65 | 0.61 | 0.015 | 0.030 | 0.05 | 0.15 | 0.02 | 10 | 151 | 0.10 |
| Heat B49 | 0.55 | 0.65 | 0.61 | 0.014 | 0.031 | 0.05 | 0.16 | 0.01 | 9 | 142 | 0.15 |
| Heat B50 | 0.54 | 0.66 | 0.62 | 0.015 | 0.032 | 0.05 | 0.15 | 0.01 | 7 | 144 | 0.20 |
| Heat B51 | 0.55 | 0.65 | 0.60 | 0.014 | 0.029 | 0.05 | 0.15 | 0.01 | 8 | 143 | 0.28 |

In the above test steels, ten steels of heat B1 to heat B10 shown in Table B1 are test steels used in the evaluation in carbon contents shown in FIG. 10, and, for heat B8, heat B9, and heat B10, the carbon content is outside the preferred carbon content range specified in the present invention. Thirteen steels of heat B11 to heat B23 shown in Table B1 are test steels used in evaluation in silicon contents shown in FIGS. 11, 12, and 13, wherein, for heat B11 to heat B16, the silicon content is below the lower limit of the silicon content range specified in the present invention and, for heat B22 and heat B23, the silicon content is above the upper limit of the silicon content range specified in the present invention. Further, twelve steels of heat B24 to heat B35 shown in Table B2 are test steels used in evaluation in manganese contents shown in FIGS. 14, 15, and 16, wherein, for heat B24 to heat B26, the manganese content is below the lower limit of the manganese content range specified in the present invention and, for heat B33 to heat B35, the manganese content is above the upper limit of the manganese content range specified in the present invention. Furthermore, eight steels of heat B36 to heat B43 shown in Table B2 are test steels used in evaluation in sulfur contents shown in FIG. 17, wherein, for heat B42 and heat B43, the sulfur content is above the upper limit of the sulfur content range specified in the present invention. Eight steels of heat B44 to heat B51 shown in Table B2 are test steels used in evaluation in vanadium contents shown in FIGS. 18 and 19, wherein, for heat B44, the vanadium content is below the lower limit of the vanadium content range specified in the present invention and, for heat B50 and heat B51, the vanadium content is above the upper limit of the vanadium content range specified in the present invention.

The specimens of the test steels were subjected to the following tests. The results are shown in the drawings.

① Machinability (Drill Service Life Test)

A hot forged material of 30 mmφ was worked by a milling machine to prepare a rectangular material having a size of 24 mm×18 mm×300 mm which was then subjected to a drilling test, and the machinability was evaluated in terms of the number of bores which could be formed by drilling until the drill failed. Testing conditions in each drawing are as follows. Diameter of drill: 5 mmφ; material of drill: SKH 51; cutting speed: 20 m/min; feed rate: 0.2 mm/rev; cutting oil: not used (dry type); bore depth: 15 mm; and evaluation method: number of bores which could be formed until the drill no longer could form a bore.

As is apparent from FIG. 10, the machinability deteriorates with increasing the carbon content, and rapidly deteriorates when the carbon content exceeds 0.6%.

As is apparent from FIG. 13, a silicon content of not more than 1% has no significant influence on the machinability. When the silicon content is 0.7 to 0.9%, the best machinability can be provided. When the silicon content exceeds 1%, the machinability is rapidly deteriorated.

As is apparent from FIG. 16, the machinability deteriorates with increasing the manganese content. When the manganese content exceeds 1%, the machinability is particularly significantly deteriorated.

Figure 18:
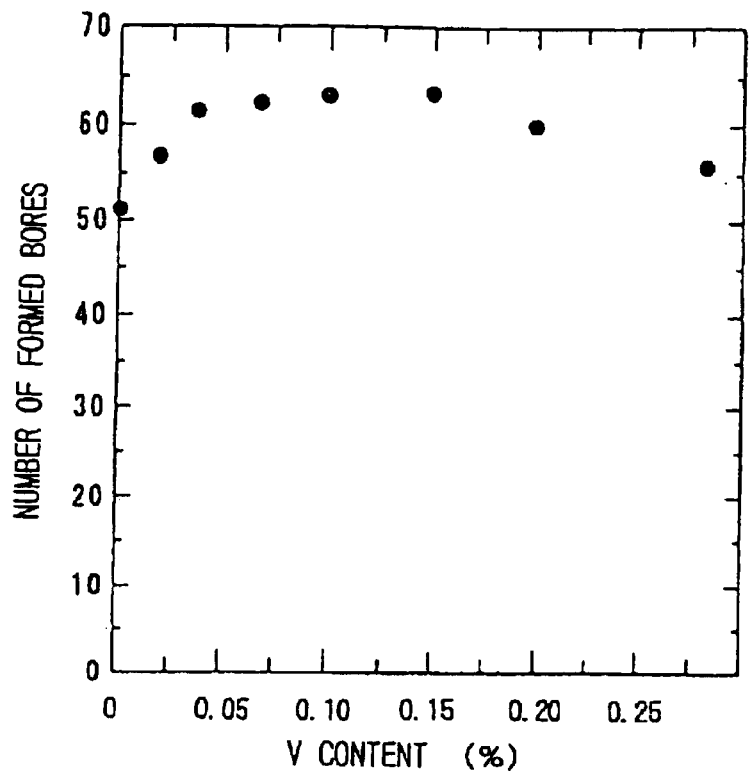
FIG. 18 is a graph showing the relationship between vanadium content of a steel product and fatigue strength in a rotating bending fatigue test.

As is apparent from FIG. 18, the machinability improves with increasing the vanadium content and deteriorates when the vanadium content exceeds 0.15%.

② Fatigue Test (Rotating Bending Fatigue Test)

A hot forged material of 20 mmφ was machined to prepare a specimen, for a rotating bending fatigue test, having a test portion size of 8 mmφ, and the specimen was subjected to a rotating bending fatigue test to evaluate the fatigue strength.

As is apparent from FIG. 11, the fatigue strength improves with increasing the silicon content.

Figure 14:
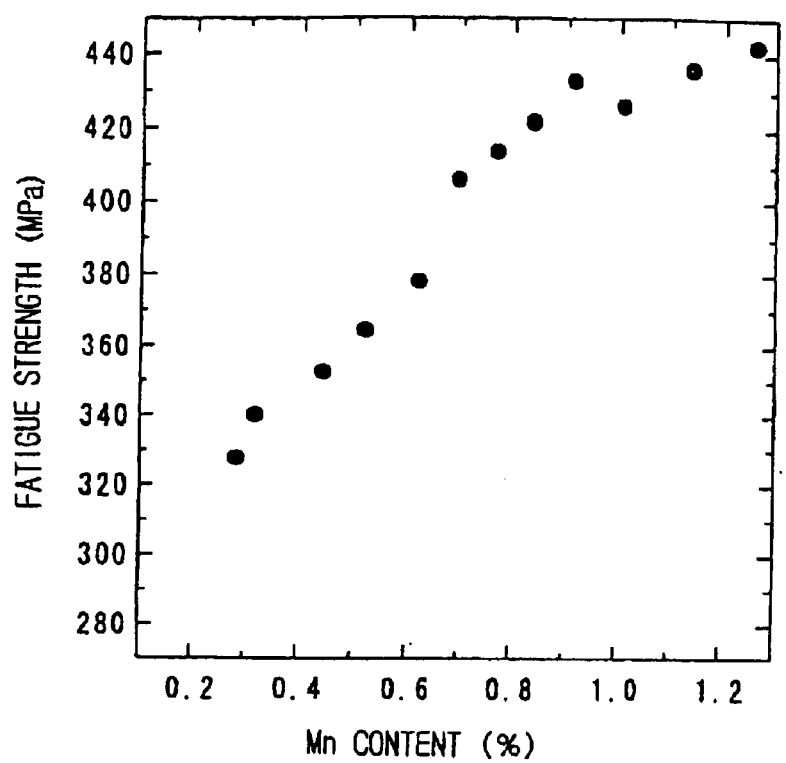
FIG. 14 is a graph showing the relationship between manganese content of a steel product and fatigue strength in a rotating bending fatigue test.

As is apparent from FIG. 14, the fatigue strength improves with increasing the manganese content.

Figure 19:
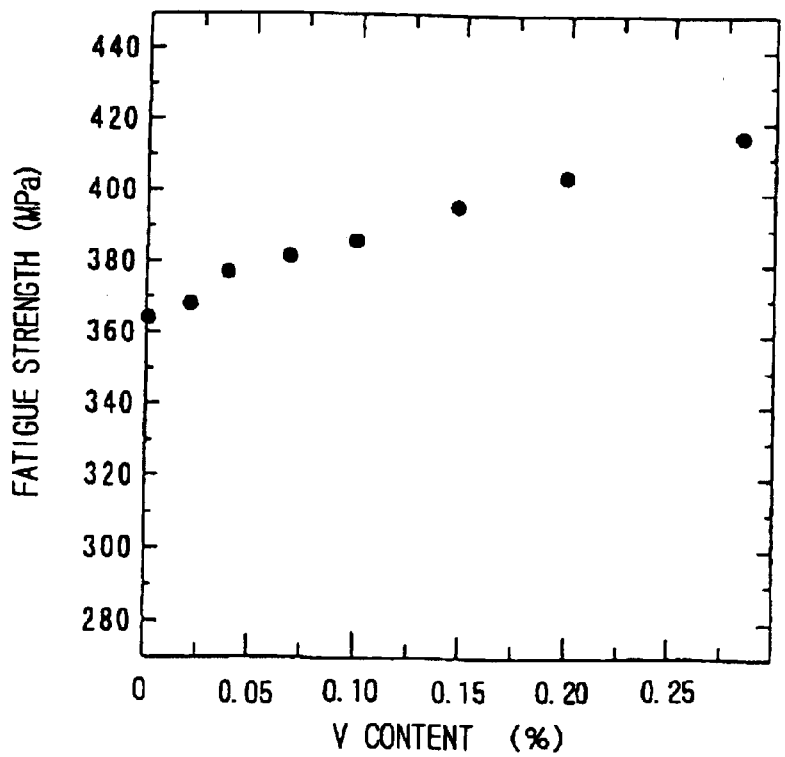
FIG. 19 is a graph showing machinability in terms of the number of bores formed by drilling as a function of vanadium content of a steel product in a drilling test.

As is apparent from FIG. 19, the fatigue strength improves with increasing the vanadium content.

③ Rolling Service Life Test (Radial Load)

A forged material of 20 mmφ was machined to prepare a specimen having a size of 12 mmφ×22 mm. The specimen was inductively hardened, was tempered, was surface polished, and was then subjected to a rolling service life test. The test was carried out under conditions of Pmax=5880 MPa, load=radial direction, and temperature=room temperature. As can be seen from FIG. 12, the rolling service life test was evaluated in terms of $L_{10}$ service life.

As is apparent from FIG. 12, the rolling service life improves with increasing the silicon content. The effect is large when the silicon content is not less than 0.5%.

④ Rolling Service Life Test (Thrust Load)

A forged material of 65 mmφ was machined to prepare a specimen having a size of 60 mmφ×7.2 mm. The specimen was inductively hardened, was tempered, was surface polished, and was then subjected to a rolling service life test. The test was carried out under conditions of Pmax=5292 MPa, load=thrust direction, and temperature=room temperature. As can be seen from FIG. 17, the rolling service life test was evaluated in terms of $L_{10}$ service life.

As is apparent from FIG. 17, when the sulfur content exceeds 0.035%, the rolling service life begins to deteriorate.

⑤ Short Heating Hardening Test

A specimen having a size of 3 mmφ×10 mm was taken off from a hot forged material having a size of 30 mmφ, was heated at 1000° C. for one sec, was rapidly cooled by helium gas, and was measured for as-quenched hardness.

Figure 15:
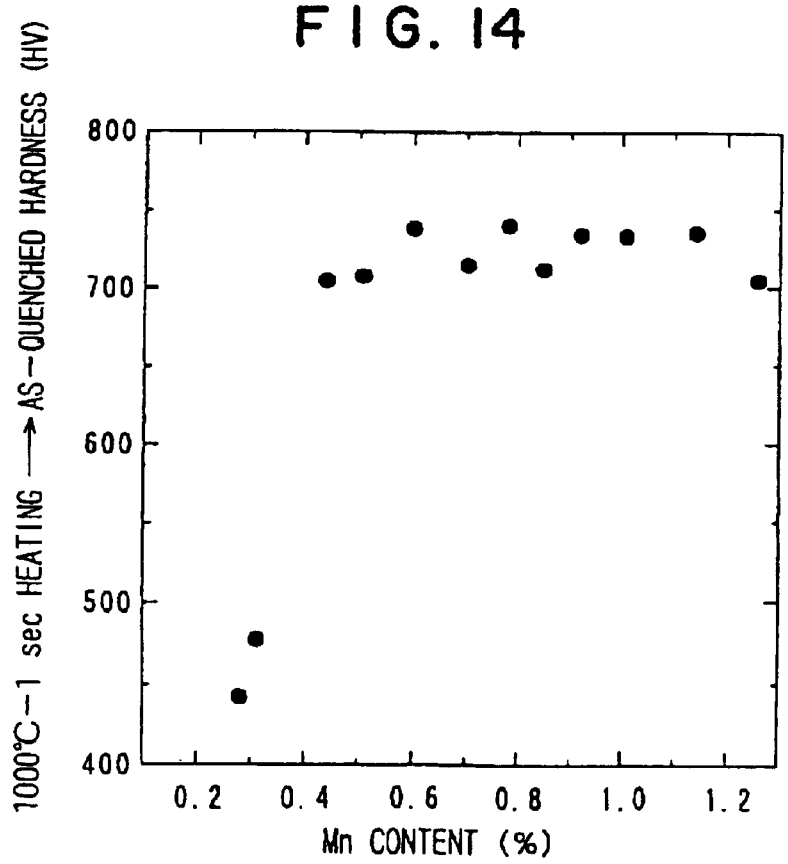
FIG. 15 is a graph showing the relationship between manganese content of a steel product and as-quenched hardness in a short heating hardening test.

As is apparent from FIG. 15, when the manganese content was less than 0.4%, the austenitization was unsatisfactory and, thus, the hardness was unsatisfactory.

As is apparent from the foregoing description, according to the present invention, the carbon content and the manganese content are limited to such a level that does not deteriorate the workability, while the silicon content and the vanadium content are increased to increase the strength. By virtue of this construction, the present invention can provide a high strength steel product for induction hardening which has unprecedentedly excellent properties, that is, while minimizing an increase in hardness after forging to ensure machinability and cold workability, is improved, for example, in fatigue strength in its nonhardened portion and, in addition, is improved, in its hardened portion, in rolling resistance level, rolling service life, antipitting level, abrasion resistance, and fatigue strength, the steel product being forged into a component a part of which is then inductively hardened before use.

What is claimed is:

1. A high strength steel for induction hardening, comprising, by mass:

carbon (C): 0.5 to 0.7%, silicon (Si): 0.7 to 1.9%, manganese (Mn): 0.5 to 1.0%, chromium (Cr): not more than 0.4%, and sulfur (S): not more than 0.035%, with the balance consisting of iron (Fe) and unavoidable impurities, said steel being forged into a component at least a part of which is then inductively hardened before use, wherein the component is a hub unit having hardened and non-hardened portions.

2. The high strength steel for induction hardening according to claim 1, wherein the equivalent of carbon $C_{eq}$ represented by formula (1) satisfies a requirement represented by formula (2):

$$C_{eq}=C\% +1/7Si\%+1/5Mn\%+1/9Cr\%-5/7S\% \quad (1)$$

$$0.75 \leq C_{eq} \leq 0.90 \quad (2).$$

3. A high strength steel for induction hardening, having improved machinability, said steel comprising, by mass, carbon (C): 0.5 to 0.7%, silicon (Si): 0.7 to 0.9%, manganese (Mn): 0.5 to 1.0%, chromium (Cr): not more than 0.4%, sulfur (S): not more than 0.035%, and vanadium (V): 0.01 to 0.15% with the balance consisting of iron (Fe) and unavoidable impurities, said steel being forged to produce a component at least a part of which is then inductively hardened before use, wherein the component is a hub unit having hardened and non-hardened portions.

4. The high strength steel for induction hardening according to claim 3, wherein the equivalent of carbon $C_{eq}$ represented by formula (1) satisfies a requirement represented by formula (2):

$$C_{eq}=C\%+1/7Si\%+1/5Mn\%+1/9Cr\%-5/7S\%+V\% \quad (1)$$

$$0.75 \leq C_{eq} \leq 0.90 \quad (2).$$

* * * * *

UNITED STATES PATENT AND TRADEMARK OFFICE
CERTIFICATE OF CORRECTION

PATENT NO.    : 6,740,175 B2
DATED         : May 25, 2004
INVENTOR(S)   : Kitano It is certified that error appears in the above-identified patent and that said Letters Patent is hereby corrected as shown below:

<u>Column 14,</u>
Line 27, "silicon 0.7 to 1.9%" should read -- silicon 0.7 to 0.9% --
Lines 32 and 51, "said steel being forged" should read -- said steel being cast and forged --

Signed and Sealed this

Fourteenth Day of December, 2004

JON W. DUDAS
*Director of the United States Patent and Trademark Office*